May 25, 1926.
G. CHAMPOUX
NUMBER PLATE BRACKET
Filed July 22, 1925
1,586,408
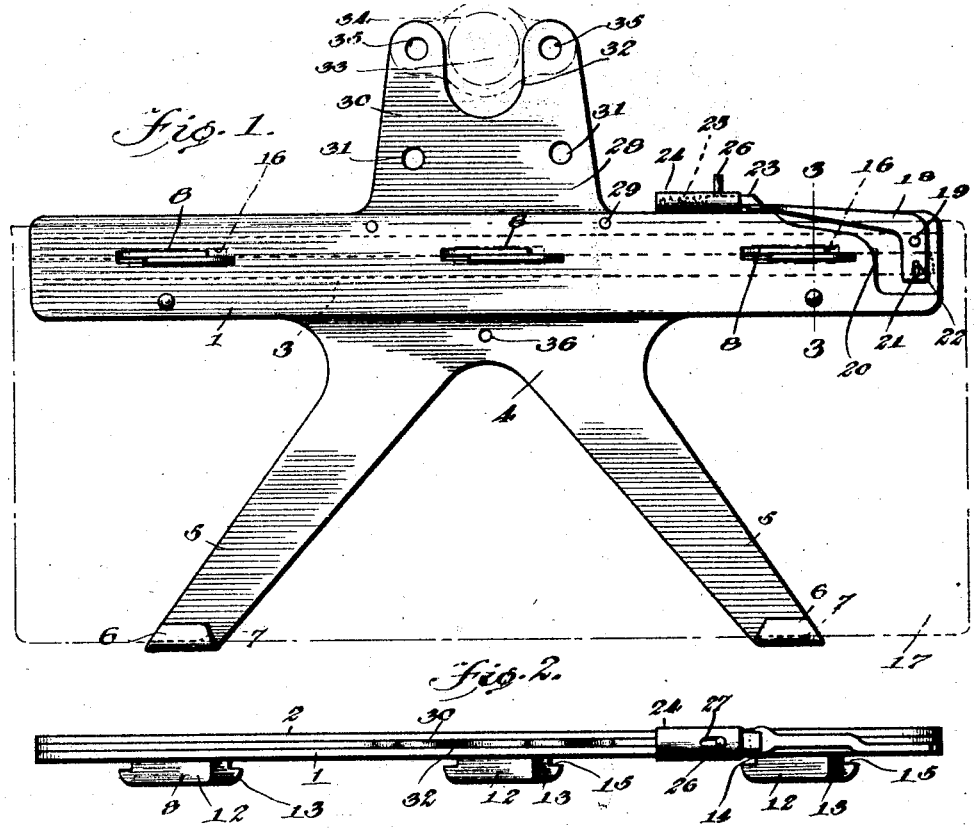
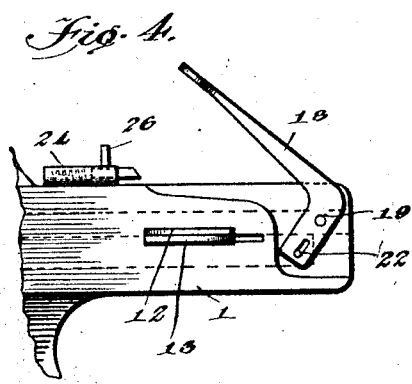
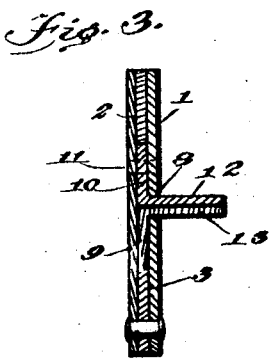
WITNESSES
INVENTOR
George Champoux
BY
ATTORNEYS Patented May 25, 1926.

1,586,408

UNITED STATES PATENT OFFICE.

GEORGE CHAMPOUX, OF SALMON FALLS, NEW HAMPSHIRE, ASSIGNOR OF ONE-FOURTH TO JOSEPH CAMIRE, ONE-FOURTH TO FREDERICK W. GARDNER, AND ONE-FOURTH TO FREDERICK G. KAESSMANN, ALL OF LAWRENCE, MASSACHUSETTS.

NUMBER-PLATE BRACKET.

Application filed July 22, 1925. Serial No. 45,355.

My invention relates to improvements in number plate brackets of the type adapted for attachment to an automobile or for like use, and it consists in the combinations, constructions and arrangements herein described and claimed.

An object of the invention is the provision of a bracket which affords facilities for holding a license number plate of any desirable size firmly, although releasably, in a desirable position on the bracket.

A further object of the invention is the provision of a bracket which not only is adapted to support a license number plate, but also has means for supporting one or more lights in a desirable position with respect to the license number plate on the bracket, so that rays of light from such light or lights will illuminate the license number plate.

A still further object of the invention is the provision of a bracket of the character described, which is economical to manufacture, reliable in use, and thoroughly practical commercially.

Other objects and advantages of the invention will be apparent from the following description considered in conjunction with the accompanying drawings, in which:

Figure 1 is a face view of the improved bracket, showing in dash lines, a license number plate supported thereon and showing also in dash lines, a tail light supported by the bracket above the license number plate.

Figure 2 is a plan view of the improved bracket,

Figure 3 is a relatively enlarged section substantially along the line 3—3 of Figure 1, and Figure 4 is a fragmentary face view showing a portion of the improved bracket with a pair of locking elements which are carried thereby, in position to release the license number plate.

The improved bracket has a body which comprises a pair of horizontally spaced vertically edgewise horizontal relatively narrow guide plates or bars 1 and 2, respectively. These guide plates have the lower edge portions thereof secured in straddling relation to the upper edge portion 3 of a vertically edgewise supporting plate 4 which has pendant divergent arm portions 5 extending downwardly and inclined oppositely from their juncture with each other and with the body of the supporting plate 4, such juncture being intermediate the ends of the supporting plate 4. The supporting plate 4 thus is disposed in a plane which extends vertically between the guide bars 1 and 2 except the lower end portions of the arms 5 which are turned outwardly through the plane of the guide plate 1, and then upwardly as indicated at 6, thus producing hooklike portions at the extremities of the arms 5 which define seats or slots as indicated at 7 for a purpose to be presently described.

The guide plate 1 is formed at intervals along its length with horizontally elongated and horizontally alined slots 8. The portions of the guide plates 1 and 2 above the plane of the upper edge of the supporting plate 3 are spaced apart with the arrangement just described, and a pair of vertically edgewise superposed locking bars 9 and 10 respectively are disposed in the space between the guides 1 and 2, above the supporting plate 3, the upper bar 10 being fixed to the guides 1 and 2, as by means of rivets 11 or like fastening devices. The upper locking bar 10 has flat locking projections 12 extending outwardly from the lower edge of the locking bar 10 through the slots 8, and the lower locking bar 9 has flat locking lugs 13 extending outwardly from the upper edge of the bar 9 and through the slots 8 in underlying relation to the locking projections 12. The locking projections 12 and 13 which protrude from the same openings 8 have notches 14 and 15 in their opposite ends for engaging with edge portions of opposite walls of openings 16 in a license number plate 17 which can be disposed flatwise against the bracket with the lower edge of the license plate resting in the seats 7 at the lower ends of the arms 5, and with the respective locking projections 12 and 13 of each pair in locking position as shown in Figures 1 and 2.

Each locking projection 13 is of less length than the slot in which it is disposed, and the locking bar 9 is capable of limited sliding movement between the guides 1 and 2 so that each locking projection 13 can be extended beyond one end of the associated locking projection 12 to position the locking projections in locking position as shown in Figures 1 and 2, or each locking projection 13 can be positioned directly underneath the associated locking projection 12, which will permit withdrawal of the associated locking projections 12 and 13 through the openings 16 of the license number plate and the license number plate then can be displaced from position on the bracket.

The operating mechanism for the slidable locking bar 9 comprises a bell crank lever 18 which is fulcrumed at 19 on the fixed locking bar 10 in a cut-out at 20 in one end of the guide bar 1, and is swingable in a vertical plane, the shorter arm of the bell crank depending in the cut-out 20 and having a slot as indicated at 21 through which a pin 22 of the slide bar 9 extends. The end portion of the other arm of the bell-crank is bent to extend above the plane of the upper edges of the guides 1 and 2, and can be releasably held against upward swinging movement from position close to the plane of the upper edges of the guides 1 and 2 by a spring pressed latch bolt 23 which is slidable in a casing 24 on the upper edges of the guides 1 and 2. The latch bolt 23 is urged by a spring 25 that is housed in the casing 24 in position to overlie the extreme end portion of the upper arm of the bell crank as shown in Figures 1 and 2, so that the lower arm of the belt crank will be retained in position to hold the slide bar 9 in such position that the respective locking projections 12 and 13 will be retained in locking position. An operating pin 26 extends from the spring pressed latch bolt upward through a slot 27 in the casing 24 and can be manipulated to retract the latch bolt so that the upper arm of the bellcrank can be swung upwardly and outwardly. This movement of the bell crank will cause the locking bar 9 to be slid from the position shown in Figures 1 and 2 toward the left hand side of the sheet of drawing, and to position to cause each locking projection 13 to move directly underneath the associated locking projection 12 as shown in Figure 4, at which time the license number plate can be displaced from the bracket.

An upper supporting plate 28 has the lower edge portion thereof disposed between the upper edge portions of the guides 1 and 2 and retained in position in any suitable known manner as by means of rivets 29. The plate 28 is extended vertically intermediate the ends of the guide plates 1 and 2 as indicated at 30, and is provided with apertures, as at 31 for the reception of fastening devices for securing a stop light holder to the plate 30.

The extension 30 is bifurcated by a vertical slot 32 through which the tail light such as indicated at 33 may extend, the tail light being carried on a plate or holder 34 which can be secured to the extension 28 by means of fastening devices which extend through openings 35 in the furcations at the upper end of the supporting plate 28.

From the foregoing description of the various parts of the device, the operation thereof may be readily understood. The device may be attached to a fixed part of an automobile or any other suitable supporting member in any suitable known manner. For example, the lower supporting plate may be provided with one or more apertures such as indicated at 36 for the reception of suitable fastening devices for attaching the bracket to a suitable support.

The license number plate can be detached from the bracket when desired, and when in position on the bracket with the locking lugs in locking position, it will be securely held against movement relatively to the bracket.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A bracket of the character described, comprising a body having a locking lug extending therefrom laterally thereof, a supporting plate depending from said body and adapted at its lower end to support a license number plate against said body so that said locking lug will extend through an opening in the license plate, and a cooperative locking lug movable on said body relatively to said first named lug to and from position to extend at one end beyond the corresponding end of said first named locking lug, said lugs being adapted when said movable lug is in extended position to engage opposite walls of the same opening in said license number plate, and to then hold said license number plate against displacement from position on said supporting plate.

2. A bracket comprising a body, a pair of cooperative superposed locking elements extending outward from said body, one of said locking elements being movable relatively to the other locking element to and from position to extend at one end beyond the corresponding end of the second locking element, said locking element being adapted when in extended position to engage with opposite walls of an opening in a license number plate to hold said license number plate against displacement from said body.

3. A bracket comprising a body, a pair of cooperative superposed locking elements extending outward from said body, one of said locking elements being movable relatively to the other locking element to and from position to extend at one end beyond the corresponding end of the second locking element, said locking elements being adapted when in extended position to engage with opposite walls of an opening in a license number plate to hold said license number plate against displacement from said body, said locking elements being substantially flat lugs having vertical notches in their opposite ends.

4. A bracket having a body comprising a pair of spaced guide plates, one of said guide plates having a slot therein, a pair of locking bars received between said guide plates, said locking bars having locking projections extending through said slot, one of said locking bars being movable to cause movement of the locking lug thereon relatively to the other locking lug to and from position to cooperate with the second locking lug to engage with opposite walls of an opening in a license number plate, and to then retain said license number plate in position against said body.

5. A bracket having a body comprising a pair of spaced guide plates, one of said guide plates having a slot therein, a pair of locking bars received between said guide plates, said locking bars having locking projections extending through said slot, one of said locking bars being movable to cause movement of the locking lug thereon relatively to the other locking lug to and from position to cooperate with the second locking lug to engage with opposite walls of an opening in a license number plate, and to then retain said license number plate in position against said body, and means for operating said movable locking bar.

6. A bracket having a body comprising a pair of spaced guide plates, one of said guide plates having a slot therein, a pair of locking bars received between said guide plates, said locking bars having locking projections extending through said slot, one of said locking bars being movable to cause movement of the locking lug thereon relatively to the other locking lug to and from position to cooperate with the second locking lug to engage with opposite walls of an opening in a license number plate, and to then retain said license number plate in position against said body, a supporting plate having the upper edge portion thereof secured between said guide plates and having a pair of downwardly divergent arms having the lower end portions thereof provided with seats adapted to receive the lower edge of said license number plate, and means for operating said movable locking bar.

7. A bracket having a body comprising a pair of spaced guide plates, one of said guide plates having a slot therein, a pair of locking bars received between said guide plates, said locking bars having locking projections extending through said slot, one of said locking bars being movable to cause movement of the locking lug thereon relatively to the other locking lug to and from position to cooperate with the second locking lug to engage with opposite walls of an opening in a license number plate, and to then retain said license number plate in position against said body, a supporting plate having the upper edge portion thereof secured between said guide plates and having a pair of downwardly divergent arms having the lower end portions thereof provided with seats adapted to receive the lower edge of said license number plate, means for operating said movable locking bar, and latching means for engaging with said locking bar operating means and cooperating with the latter to releasably hold said movable lock bar with the lug thereon in locking position.

8. A bracket having a body comprising a pair of spaced guide plates, one of said guide plates having a slot therein, a pair of locking bars received between said guide plates, said locking bars having locking projections extending through said slot, one of said locking bars being movable to cause movement of the locking lug thereon relatively to the other locking lug to and from position to cooperate with the second locking lug to engage with opposite walls of an opening in a license number plate, and to then retain said license number plate in position against said body, a supporting plate having the upper edge portion thereof secured between said guide plates and having a pair of downwardly divergent arms having the lower end portions thereof provided with seats adapted to receive the lower edge of said license number plate, means for operating said movable locking bar, an upper supporting plate having the lower edge portion thereof secured between said guide plates and extending above the upper edge of said license number plate, said upper supporting plate being adapted to support a source of light thereon.

9. A bracket comprising a pair of horizontally vertical edgewise guide plates, one of said guide plates having horizontally alined spaced longitudinally extending slots therein, a lower supporting plate having the upper edge portion thereof secured between the lower edge portions of said guide plates and having a pair of downwardly divergent supporting arms turned upward and outward at their lower ends to form seats on which a license number plate may rest at its lower edge, said license number plate having slots in line with the slots in said one guide plate, a pair of superposed vertically edgewise lock bars received between said guides, said lock bars having locking projections extending from said alined slots in said one guide plate and in said license number plate, one of said locking bars being movable relatively to the other locking bar to position the locking projections thereon in position to cooperate with the locking projections on the other locking bar to engage with opposite walls of the opening in said license number plate, and to then retain said license number plate against displacement from position from said seats at the lower ends of the arms of said supporting plate, and means for operating said movable locking bar.

10. A bracket comprising a pair of horizontally vertical edgewise guide plates, one of said guide plates having horizontally alined spaced longitudinally extending slots therein, a lower supporting plate having the upper edge portion thereof secured between the lower edge portions of said guide plates and having a pair of downwardly divergent supporting arms turned upward and outward at their lower ends to form seats on which a license number plate may rest at its lower edge, said license number plate having slots in line with the slots in said one guide plate, a pair of superposed vertically edgewise lock bars received between said guides, said lock bars having locking projections extending from said alined slots in said one guide plate and in said license number plate, one of said locking bars being movable relatively to the other locking bar to position the locking projections thereon in position to cooperate with the locking projections on the other locking bar to engage with opposite walls of the opening in said license number plate, and to then retain said license number plate against displacement from position from said seats at the lower ends of the arms of said supporting plate, means for operating said movable locking bar, and other means for cooperating with said locking bar operating means to releasably hold the said locking bar in locking position.

GEORGE CHAMPOUX.